United States Patent [19]

Swan

[11] 4,396,123

[45] Aug. 2, 1983

[54] TAPE CASSETTE HOLDER

[76] Inventor: Milton D. Swan, 4417 Red Maple Ct., Concord, Calif. 94521

[21] Appl. No.: 255,794

[22] Filed: Apr. 20, 1981

[51] Int. Cl.³ .............................................. A47B 81/06
[52] U.S. Cl. ...................................... 211/40; D6/185
[58] Field of Search ............................. 211/40, 42, 41; 312/8–20; 248/314, 111, 110; 206/387

[56] References Cited

U.S. PATENT DOCUMENTS

| D. 231,063 | 4/1974 | Rafaat | D6/185 |
| D. 257,307 | 10/1980 | Schweizer | D6/185 |
| 3,502,222 | 3/1970 | Crafoord | 211/40 |
| 3,746,180 | 7/1973 | Spiroch et al. | 211/41 X |
| 3,759,395 | 9/1973 | Juhlin | D6/185 |
| 4,285,554 | 8/1981 | Bell et al. | 211/40 X |
| 4,307,809 | 12/1981 | Haswell | 248/314 |
| 4,317,603 | 3/1982 | Pepicelli et al. | 211/40 |

FOREIGN PATENT DOCUMENTS

| 509851 | 12/1975 | Fed. Rep. of Germany | 211/40 |
| 566616 | 9/1975 | Switzerland | 211/40 |

Primary Examiner—Ramon S. Britts
Assistant Examiner—Peter A. Aschenbrenner
Attorney, Agent, or Firm—Harris Zimmerman; Howard Cohen

[57] ABSTRACT

A tape cassette holder includes a first panel and a second panel extending integrally and orthogonally from one edge of the first panel. A plurality of L-shaped dividers is disposed perpendicular to both of the panels, and is spaced laterally and secured thereto to define a plurality of slot openings therebetween. Each divider member includes a flange extending laterally therefrom, each pair of adjacent flanges defining a narrow portion of the respective slot opening which is adapted to engage and retain a portion of a tape cassette. A mounting plate includes means for joining the plate permanently to a surface, and also includes a plurality of mounting slot openings therein. The first panel includes a like plurality of T-shaped mounting studs which are disposed to be releasably secured in the slot openings of the mounting plate.

5 Claims, 8 Drawing Figures

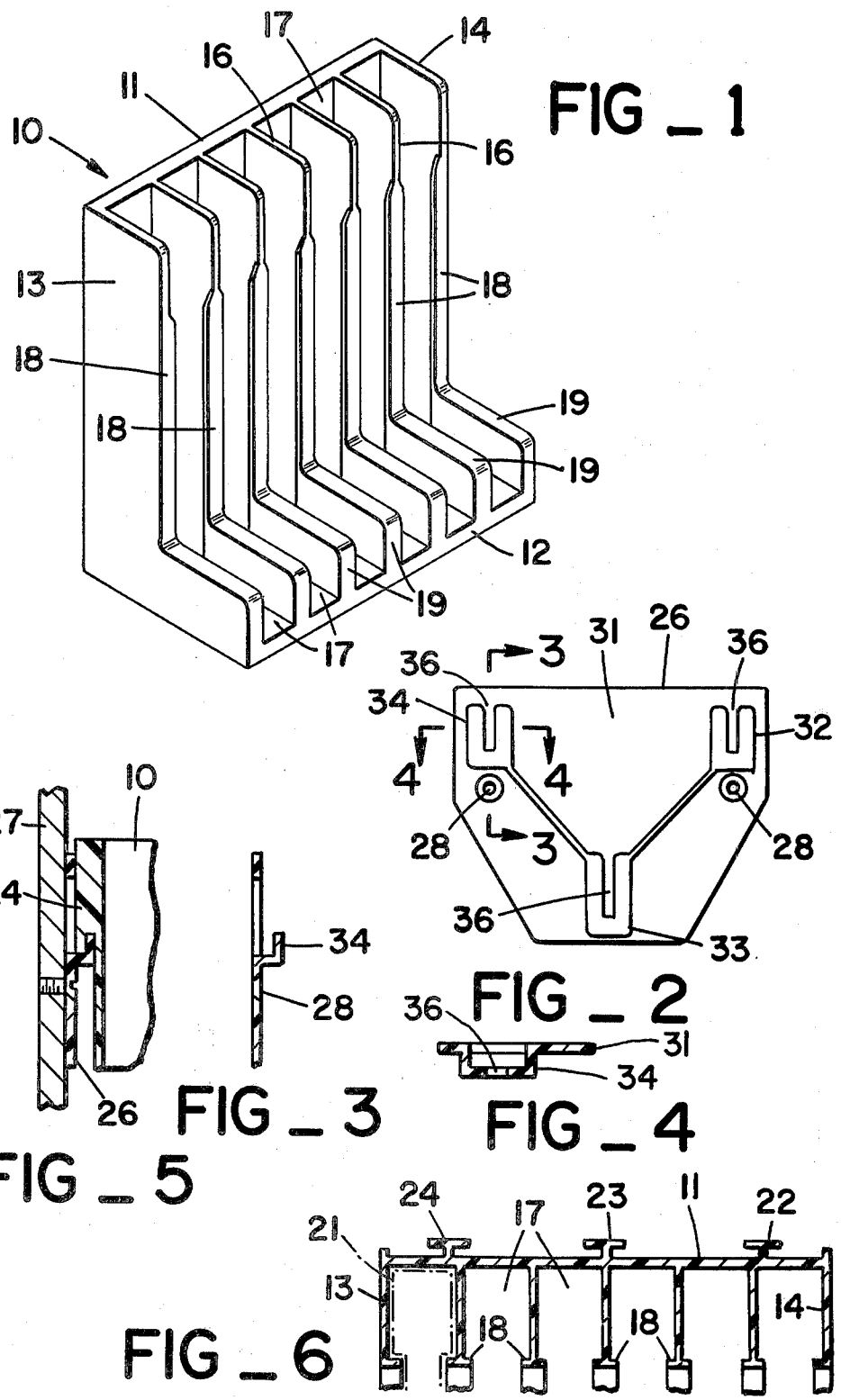

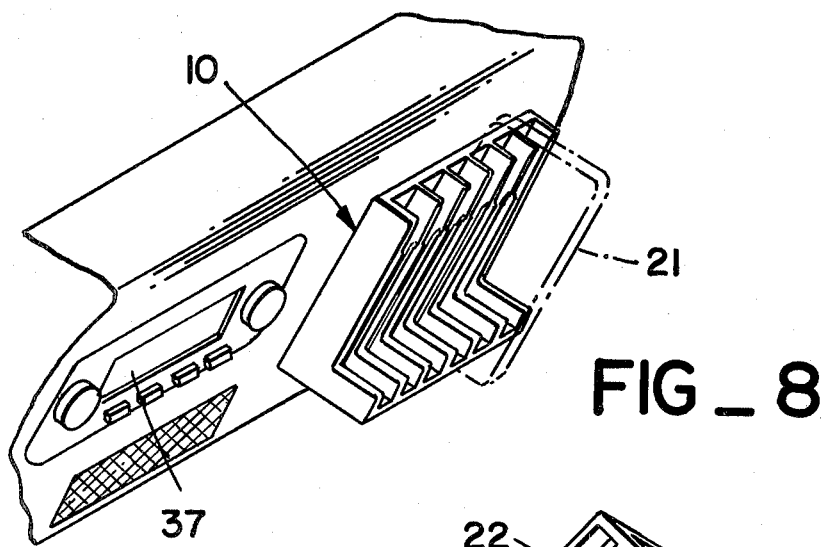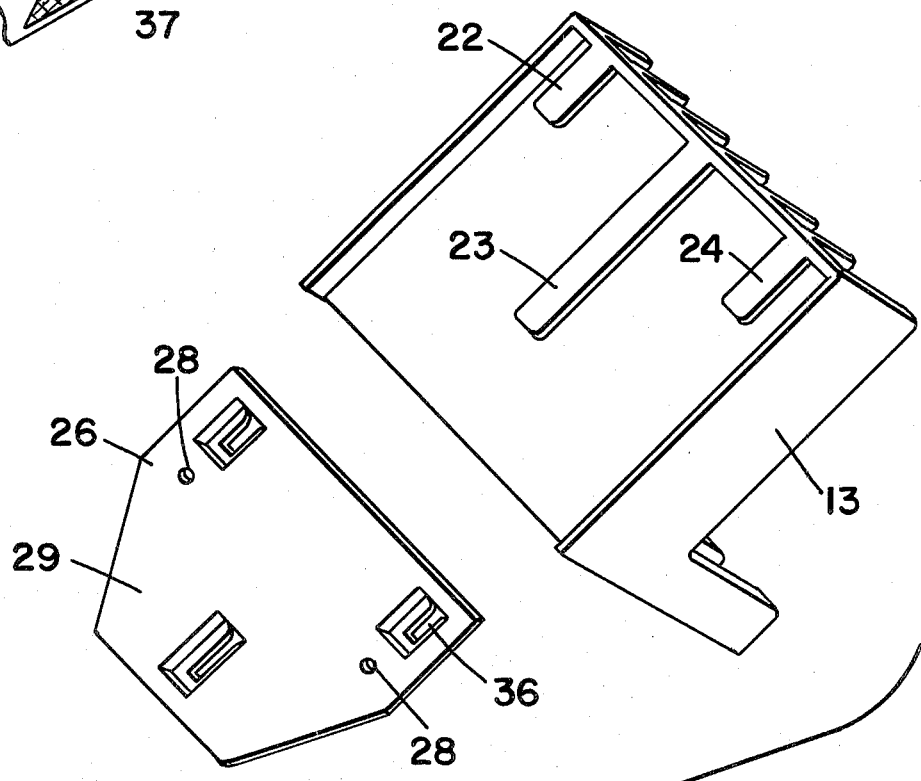

TAPE CASSETTE HOLDER

BACKGROUND OF THE INVENTION

In recent years, magnetic tape cassettes have become extremely popular as a medium for voice and musical recordings. The advent of tape cassettes has also been largely responsible for the overwhelming commercial success of automotive and other vehicular stereophonic sound systems. Unfortunately, the proliferation and success of tape cassettes has created the problem of storing and transporting the tape cassettes in an efficient and sensible manner. This problem is especially acute with respect to automotive and vehicular sound systems which employ tape cassettes. The cassettes are often stored in slotted boxes or covered carrying cases which are dimensioned to receive a plurality of the cassettes. However, the passenger compartments of automobiles and other vehicles are severely lacking in lateral surfaces upon which these containers may be supported. As a result, these containers, known in the prior art, are often relegated to residing on the floor of a passenger compartment, or to window shelf spaces, or the like. In these locations, the tape cassette containers are subject to casual abuse by the feet of the passengers, or to contamination by dirt, dust, or water. Furthermore, the convenience of these prior art containers is negated by the remote locations in which they are usually stored in the vehicle.

SUMMARY OF THE PRESENT INVENTION

The present invention generally comprises a tape cassette holder for storing and transporting a plurality of tape cassettes. Its most salient features are that it requires no lateral surface for support, it is capable of maintaining the cassettes in a convenient yet unobtrusive location, and it is easily removed or installed to facilitate portability.

The tape cassette holder of the present invention comprises a generally L-shaped frame formed by a first panel and a second panel extending integrally and orthogonally from one edge of the first panel. A plurality of L-shaped divider members are secured to the first and second panel members in perpendicular relationship thereto, and are laterally spaced along the panel member to define a plurality of slot openings therebetween. Each divider member includes laterally extending flange portions which are adapted to engage and retain therebetween the widest shoulder portion of a typical tape cassette. As a result, cassettes may be slid into the slot openings which one end thereof resting on the second panel and the cassettes being retained therein by the lateral-ly extending flanges of the divider members.

The invention also includes a mounting plate which has a back surface provided with means to secure the mounting plate to any upwardly extending or obliquely extending surface. The front surface of the mounting plate is provided with a plurality of bosses which extend outwardly from the mounting plate. The bosses are each provided with a slot opening therein which is adapted to receive a plurality of mounting lugs which project from the rear surface of the first panel of the tape cassette holder. The mounting lugs have a T cross-sectional configuration, and are adapted to be removably received in the slot openings of the mounting plate. Thus the mounting plate may be permanently secured to a structural surface, while the tape holder itself is removably secured to the mounting plate.

A BRIEF DESCRIPTION OF THE DRAWING

FIG. 1 is a perspective view of the tape cassette holder of the present invention.

FIG. 2 is a plan view of the mounting plate of the present invention.

FIG. 3 is a partial cross-sectional elevation of the mounting plate of the present invention, taken along line 3—3 of FIG. 2.

FIG. 4 is a cross-sectional view of a portion of the mounting plate of the present invention, taken along line 4—4 of FIG. 2.

FIG. 5 is a cross-sectional elevation showing the assembly of the tape cassette holder and mounting plate secured to a structural surface.

FIG. 6 is a cross-sectional view of the tape cassette holder of the present invention.

FIG. 7 is an exploded view of the tape cassette holder and the mounting plate of the present invention.

FIG. 8 is a perspective view of a typical installation of the present invention.

DESCRIPTION OF THE PREFERRED EMBODIMENT

With reference to FIGS. 1 and 6, the tape cassette holder assembly of the present invention includes a cassette holder 10 which is formed of a first rectangular panel 11 and a second rectangular panel 12 extending integrally and orthogonally from the lower edge of the panel 11. A plurality of L-shaped side walls 13 and 14 extend integrally from the opposed edges of the cassette holder, and are disposed orthogonally to both of the panels 11 and 12. A plurality of L-shaped divider members 16 are secured to the panel members 11 and 12 in orthogonal fashion, and are laterally spaced apart between the side walls 13 and 14. The divider members 16, together with the side walls 13 and 14, define a plurality of slot openings 17, each of which is adapted to receive and secure a tape cassette.

With particular reference to FIG. 6, the upper portion of each divider member 16, as well as the upper portions of the side walls 13 and 14, are provided with laterally extending flanges 18 which are disposed at the outer edge portions of the divider members and side walls. The gap between adjacent flanges 18 is narrower than the slot openings 17. The foot portions 19 of the divider members 16 are wider than the upper portions of the divider members. Indeed, the thickness of the foot portions of the divider members is substantially equal to the width of the flanges 18, so that the width of the slot opening 17 between the foot portions of the divider member 16 is substantially equal to the width of the slot openings between the flanges 18.

With reference to FIG. 6, the slot openings 17 are each dimensioned to receive and retain a tape cassette 21, shown in phantom line. The wider upper portion of each slot opening 17 is adapted to receive the wide shoulder portion of a typical tape cassette as known in the prior art. The narrow portions of each slot opening, i.e., between adjacent flanges 18 and adjacent foot portions, is adapted to receive the narrower body portion of a typical tape cassette. Thus it may be appreciated that the typical tape cassette may be slidably introduced into the upper opening of a slot opening 17, and slid downwardly until the side edge of the cassette impinges upon the panel 12 of the holder. The narrow opening between the flanges 18 secures the wider shoulder portion of the cassette, so that the cassette can be removed from the slot only by sliding it upwardly and out of the upper opening of the slot.

With reference to FIGS. 6 and 7, a trio of mounting lugs 22, 23, and 24 extend from the other side of the panel 11 and are spaced laterally therealong. The distal portions of the mounting lugs 22–24 are undercut to provide a T configuration, as is evident in FIG. 6.

The present invention also includes a mounting plate 26 which is provided with means for permanent securance to a mounting surface 27, as shown in FIG. 5. The means for securing the mounting plate 26 to the mounting surface include a pair of countersunk screw holes 28, as shown in FIG. 2. The surface 29 of the mounting plate may also be provided with a coating of self-adhesive material so that the plate may be joined to surfaces which are not well suited for the use of screws.

Extending from the other side 31 of the mounting plate 26 is a trio of bosses 32, 33, and 34 as shown in FIG. 2. Each of the bosses projects outwardly from the plate and is provided with a T slot opening 36. The T slots of the bosses 32–34 are adapted to receive and retain the T portions of the mounting lugs 22–24, respectively, as shown for example in FIG. 5. The engagement of the mounting lugs and slots 36 is maintained by the frictional engagement of the respective parts. Thus, the tape holder 10 may be selectively secured to or removed from the mounting plate 26 which is permanently secured to the surface 27.

As shown in FIG. 8, the present invention may advantageously be secured to an upwardly extending dashboard surface of a vehicle, generally adjacent to a typical cassette tape player 37. The preferred embodiment of the present invention is adapted to retain six tape cassettes, and these cassettes may be supported directly adjacent to the player in which they are used. A plurality of cassette holders 10 may be filled with cassettes and installed and removed interchangeably on the mounting plate which is secured to the dashboard surface. It may be appreciated that the invention, as shown in FIG. 8, requires no lateral surface for support, and does not occupy any space normally required for the comfort of the vehicle passengers. Also, the tape holder 10 easily may be removed from the vehicle when the vehicle is left unattended, so that theft and vandalism may discouraged.

What is claimed is:

1. A tape cassette holder assembly, comprising a first panel member and a second panel member extending from the lower edge thereof, a plurality of generally L-shaped divider members secured to both said panel members and spaced laterally therealong to define a plurality of slot openings therebetween, means for securing a plurality of standard tape cassettes in said slot openings, including a plurality of flanges extending laterally from the upper portions of said divider members to define therebetween narrow channel openings extending longitudinally between said upper portions of said divider members, said narrow channel openings each adapted to engage and retain the protruding shoulder portions of a tape cassette in slidable fashion, the lower portions of said dividers adjacent to said second panel member being wider than the upper portions to define lower slot portions narrower than said upper slot portions, said lower slot portions each being adapted to engage and support the body portions of a tape cassette, and means for mounting said assembly to a support surface.

2. The tape cassette holder of claim 1, wherein said first and second panel members are disposed in generally orthogonal fashion.

3. The tape cassette holder assembly of claim 1, wherein said last mentioned means includes a mounting plate, means for permanently securing said mounting plate to a support surface, and means for removably joining said first panel member to said mounting plate, whereby any one of a plurality of tape cassette holder assemblies may be interchangably supported by said mounting plate.

4. The tape cassette holder of claim 3, wherein said last mentioned means includes a plurality of mounting lugs extending from said first panel, a plurality of bosses extending from said mounting plate, each of said bosses including an opening therein adapted to receive and frictionally retain one of said mounting lugs.

5. The tape cassette holder of claim 4, wherein said mounting lugs each are provided with a T-configuration, and each of said openings in said bosses is provided with a complementary T configuration to receive one of said mounting lugs.

* * * * *